June 14, 1932.  J. GRAVES  1,863,304
MOLD
Filed Jan. 2, 1931    2 Sheets-Sheet 2
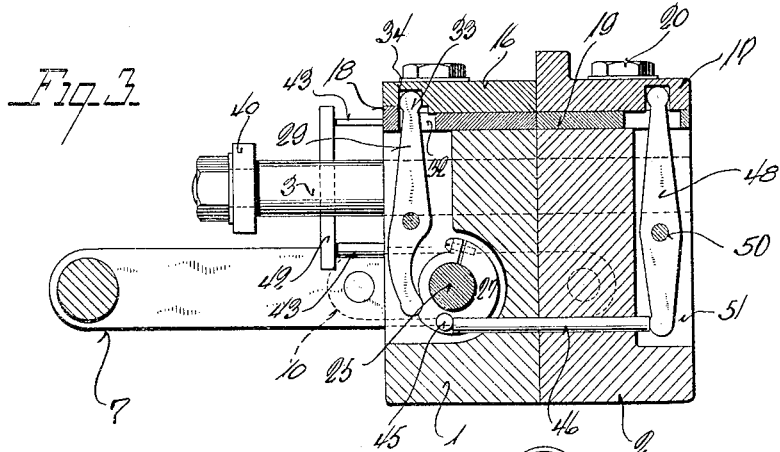
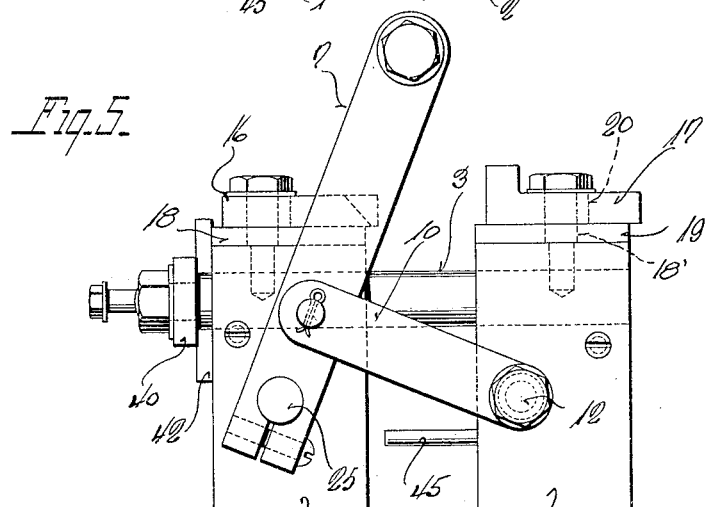
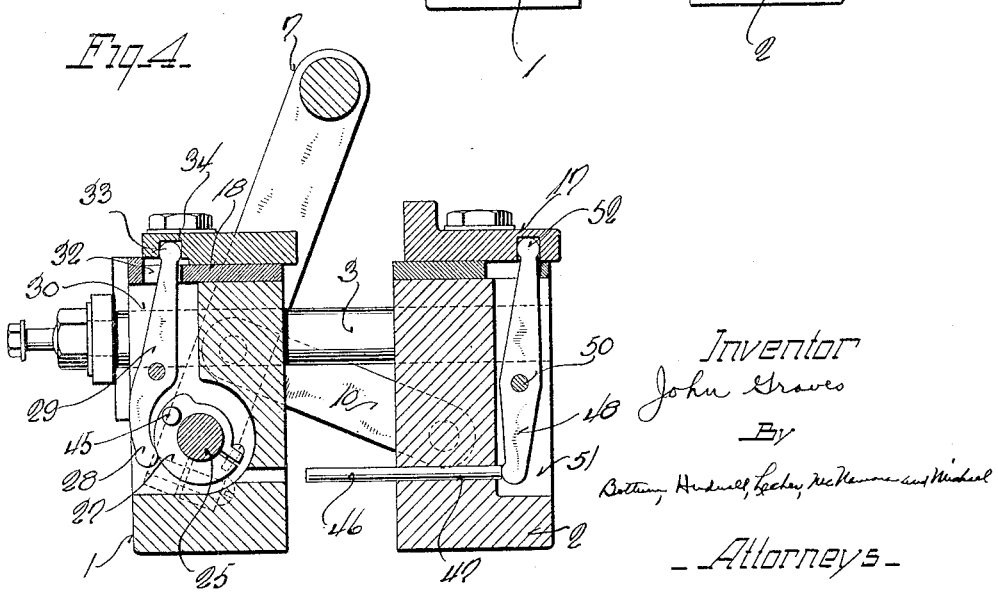
Inventor
John Graves Patented June 14, 1932

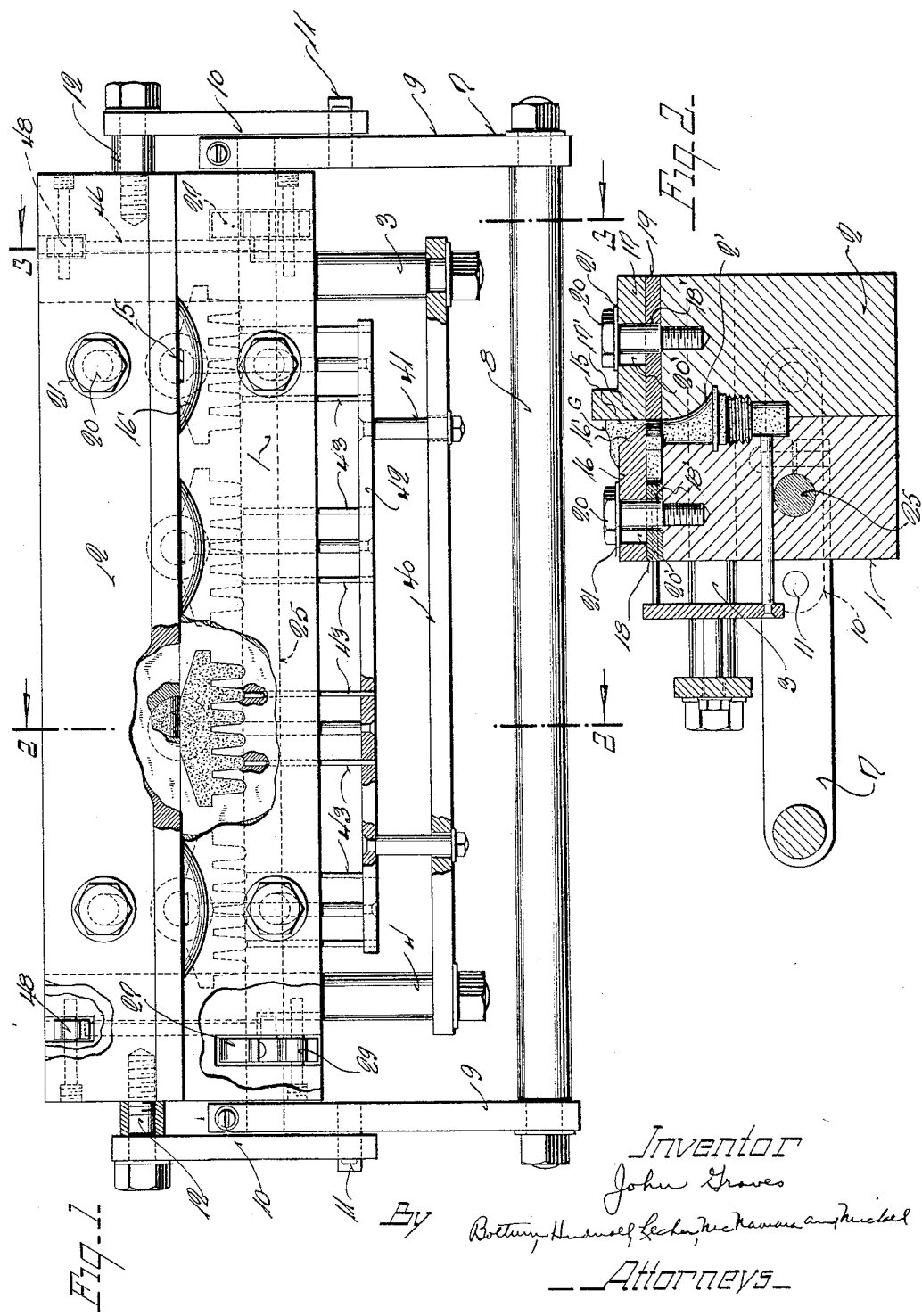

1,863,304

UNITED STATES PATENT OFFICE

JOHN GRAVES, OF MILWAUKEE, WISCONSIN, ASSIGNOR TO GLOBE-UNION MFG. CO., OF MILWAUKEE, WISCONSIN, A CORPORATION OF WISCONSIN

MOLD

Application filed January 2, 1931. Serial No. 506,113.

This invention relates to an improvement in molds especially designed and adapted for use in casting parts of storage batteries, although also adapted for other uses.

In the usual mold of the type of the present invention it is customary to pour the casting, next operate a handle which shears off the gates and then operate a second handle which opens the mold, after which the mold is closed and the cycle repeated.

One of the principal objects of the present invention is to simplify and facilitate or speed up the operation of the mold. This is accomplished by eliminating the necessity of the operator separately manipulating the means which shears off the gates and the means which opens and closes the mold. All that the operator has to do is to manipulate a single handle which opens and closes the mold and also actuates the means functioning to shear off the gates and the means operating to eject the castings.

Another object of the invention is to provide a mold of this character having these advantages and capacities and which is of simple and durable construction, reliable and effective in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a top plan view showing a mold embodying the present invention, parts being broken away for the sake of illustration;

Figures 2 and 3 are sectional views taken on lines 2—2 and 3—3, respectively, of Figure 1;

Figure 4 is a sectional view similar to Figure 3, but showing a different position of the parts; and Figure 5 is a view in end elevation showing the mold in open position, that is, with its parts occupying the same position as shown in Figure 4.

Referring to the drawings, it will be seen that the mold embodying the present invention includes a pair of sections or mold parts designated at 1 and 2. Preferably, the mold part 1 is securely fastened to a suitable supporting structure (not shown) and the mold part 2 is mounted on the mold part 1 for sliding movement toward and away from the latter by means of slide rods 3 and 4, the slide rods being secured to the mold part 2 and being slidably fitted in openings provided therefor in the fixed part 1.

For opening and closing the mold a handle designated generally at 7 is provided and is of bail-like form in that it includes a rod-like body portion 8 and arms 9 at the ends of the body portion 8, the arms 9 being pivotally mounted or fulcrumed on the fixed mold part 1. Links 10 interconnect the handle 7 and the movable mold part 2, one end of each link 10 being pivotally connected as at 11 to an intermediate portion of its arm 9 and the other end of each link being pivotally connected as at 12 to one end of the movable mold part 2. With this construction, when the handle 7 occupies the position shown in Figures 1, 2 and 3 the mold is closed. By swinging the handle upwardly to the position shown in Figures 4 and 5 the mold is opened inasmuch as the handles exert a thrust upon the links 10 and the links in turn slide the movable part of the mold away from the fixed part.

Referring to Figure 2 of the drawings, it will be seen that the parts 1 and 2 of the mold have complementary recesses 2' which define mold cavities of the shape and design desired. In the present instance each mold cavity has the external configuration of a strap adapted for use in connecting the grids of a storage battery cell.

Leading into each mold cavity is a pouring opening 15 which is defined by portions 16' and 17' of movable top pieces or top plates 16 and 17 of the mold parts 1 and 2, respectively. Interposed between the top plate 16 and 17 and the mold parts 1 and 2 are comb plates 18 and 19.

The top plates 16 and 17 are constrained to slight sliding movement relative to the mold parts and the comb plates 18 and 19 are securely held in place by means of stud bolts 20 and washers 21, the stud bolts having their lower ends threaded into the mold parts and having their shanks snugly fitted in openings 18' in the comb plates and slidably fitted in slots 20' provided in the top plates. This mounting of the top plates provides for their relative movement with respect to the comb plates for shearing off the gates, that is the excess metal left in each opening 15 after each pouring.

The present invention provides means which utilizes the movement of the handle 7 to shift the top plates 16 and 17 at the proper time. In carrying out this purpose the arms 9 of the handle 7 are secured or clamped to the projecting ends of an operating shaft 25 which extends longitudinally of and is rotatably fitted in an opening provided therefor in the mold part 1. Adjacent its ends, cams 27 are fixed on the shaft 25 and co-act with the suitably shaped lower ends 28 of rock levers 29, the rock levers being fulcrumed in recesses 30 in the mold part 1 and having their upper ends extended through openings 32 in the comb plate 18 and terminating in rounded or ball like extremities 33 operatively fitted in sockets or notches 34 machined in the underside of the top plate 16. The cams 27 are so shaped and designed as to rock the levers 29 when the handle 7 is first moved upwardly from the position shown in Figure 2. During this initial movement of the handle 7 the pivotal connections 11 between the handle and the links are just moving from dead center and consequently their motion is substantially vertical and has but a very slight horizontal component. As a consequence, the levers 29 are rocked and the top plate 16 shifted to shear off the gates prior to the opening of the mold. As the swinging movement of the handle 7 is continued the movable mold part 2 is thrust to the right and of course the slide rods 3 travel with it.

The ends of the slide rods 3 adjacent the handle in the closed position of the mold are connected by cross bar 40 which slides on headed pins 41 projecting from a crosshead or carrier bar 42 equipped with a plurality of ejector pins 43. The ejector pins 43 are slidably fitted in openings provided in the mold part 1 and its comb plate 18 and their inner ends are adapted to be forced into the mold cavities to displace the castings therefrom. When the mold part 2 is approaching full open position, the cross bar 42 moving with the slide rods 3 engages the carrier bar 42 and pushes it toward the mold part 1 thereby forcing the ejector pins 43 into the mold cavity and displacing the casting therefrom. When the mold is closed, the cross bar 40 engages the heads of pins 41 to return the ejector finger to idle position.

When the handle 7 is returned from the position shown in Figures 4 and 5 to the position shown in Figures 1 and 3 the motion of the shaft 25 is utilized to reposition the top plates 16 and 17. This is accomplished by providing lateral actuating pins 45 on each of the cams 27 and so disposing these actuating pins 45 as to cause them to coact at the proper time with slide rods 46 fitted in openings 47 in the movable mold part 2 and engageable with rock levers 48 similar to the rock levers 29 but fulcrumed as at 50 in recesses 51 in the mold part 2 and interconnected as at 52 at their upper ends with the top plate 17. When the mold is closed pins 45 strike the slide rods 46 and rock the lever 48 to the position shown in Figure 3 thereby effecting repositioning of the top plates.

The invention claimed is:

1. A mold comprising relatively movable mold parts adapted when closed to provide a mold cavity and when opened to provide for the release of the casting from the mold cavity, means for shearing off the excess metal from the casting, operating mechanism for moving the mold parts to open and closed position and having a single operating handle and means actuated by said operating mechanism for actuating said shearing means.

2. A mold comprising relatively movable mold parts adapted when closed to provide a mold cavity and when open to provide for a release of the casting from the mold cavity, a gate shear, a single operating handle, and means actuated by the operating handle and connected to the mold parts and to the gate shear to cause initial operation of the gate shear and subsequent opening of the mold when the handle is moved in one direction.

3. A mold comprising relatively movable mold parts, plates mounted on said parts and supported for shifting movement and adapted to shear off excess metal from the casting at the entrance to the mold, operating mechanism connected with the mold parts for imparting relative movement thereto, a single handle for said operating mechanism, a shaft connected to said handle, cams on said shaft, rock levers fulcrumed on one of the mold parts and engaged with said cams and with one of said plates and means actuated from said cams and connected to the other plate to effect repositioning thereof.

4. A mold comprising relatively movable mold parts, plates mounted on said parts and supported for shifting movement and adapted to shear off excess metal from the casting at the entrance to the mold, operating mechanism connected with the mold parts for imparting relative movement thereto and a single handle for said operating mechanism, a shaft connected to said handle, cams on said shaft, rock levers fulcrumed on one of the mold parts and engaged with said cams and with one of said plates, a second set of rock levers connected to the other plate and fulcrumed on the other mold part, slide rods engaged with said second set of rock levers and pins connected to said cams and cooperable with said slide rods.

5. A mold including a pair of mold parts supported for sliding movement toward and away from each other, a handle fulcrumed on one of the parts, links connecting said handle with the other mold part, means coacting with the mold parts for shearing off the excess metal at the entrance to the mold and mechanism actuated from said handle for operating said shearing means when the handle is moved to open the mold.

6. A mold comprising relatively movable mold parts, means supporting said mold parts for movement to open and closed position, a gate shear associated with said mold parts, a single handle pivoted to one of the mold parts and interconnected with the other mold part for moving the mold parts to open and closed position, and means actuated from said handle for operating the gate shear.

7. A mold comprising relatively movable mold parts, plates mounted on said parts and supported for shifting movement and adapted to shear off excess metal from the casting at the entrance to the mold, a bail-like handle fulcrumed on one of the mold parts, links pivotally connected to the handle and the other mold part, a shaft connected to the handle and turned thereby, and motion transmission means between the shaft and the plates for operating said plates.

8. A mold comprising relatively movable mold parts, gate shearing means associated with said mold parts, a handle fulcrumed on one of the mold parts, links connected to the handle and the other mold parts whereby the handle is operable to open and close the mold, a shaft actuated from the handle, rock levers fulcrumed on one of the mold parts and connected to the gate shearing means for operating the same, and cams mounted on the shaft and cooperable with the rock levers for causing the same to operate the gate shearing means.

9. A mold comprising relatively movable mold parts, gate shearing means associated with said mold parts, a handle fulcrumed on one of the mold parts, links connected to the handle and the other mold parts whereby the handle is operable to open and close the mold, a shaft actuated from the handle, rock levers fulcrumed on one of the mold parts and connected to the gate shearing means for operating the same, cams mounted on the shaft and cooperable with the rock levers for causing the same to operate the gate shearing means, and means actuated from the cams for repositioning the gate shearing means when the mold is closed.

10. In a mold for the purpose described, a mold, a shearing member cooperable with the mold and having pouring openings, knockout pins operatively associated with the mold and a single handle for regulating the action of the mold, shearing member and knockout pins.

11. A mold comprising relatively movable mold parts, adapted when closed to provide a mold cavity and when open to provide for the release of the casting from the mold cavity, a gate shear, casting ejecting means, and a single handle for operating the gate shear, opening and closing the mold, and actuating said casting ejecting mechanism.

In witness whereof, I hereto affix my signature.

JOHN GRAVES.